US012781909B2

(12) United States Patent
Dalpez et al.

(10) Patent No.: US 12,781,909 B2
(45) Date of Patent: Nov. 3, 2026

(54) DISTRIBUTION LINE COMPONENT AND DISTRIBUTOR ASSEMBLY MODULARLY FORMED THEREWITH

(71) Applicant: Röchling Automotive SE, Mannheim (DE)

(72) Inventors: Stefano Dalpez, Malè (TN) (IT); Alessandro Iviglia, Tesimo (BZ) (IT); Fabrizio Chini, Isera (TN) (IT); Matteo Guindani, Cremona (CR) (IT); Elia Mulas, Cavedine (TN) (IT)

(73) Assignee: Röchling Automotive SE, Mannheim (DE)

( * ) Notice: Subject to any disclaimer, the term of this patent is extended or adjusted under 35 U.S.C. 154(b) by 392 days.

(21) Appl. No.: 17/582,095

(22) Filed: Jan. 24, 2022

(65) Prior Publication Data

US 2022/0235894 A1 Jul. 28, 2022

(30) Foreign Application Priority Data

Jan. 26, 2021 (DE) ..................... 10 2021 101 639.8

(51) Int. Cl.
*F16L 57/02* (2006.01)
*F16L 41/02* (2006.01)

(52) U.S. Cl.
CPC ............... *F16L 57/02* (2013.01); *F16L 41/02* (2013.01); *F15B 2211/3053* (2013.01)

(58) Field of Classification Search
CPC . F16L 57/02; F16L 41/02; F16L 17/06; F16L 21/05; F16L 41/021; F16L 41/026; F15B 2211/3053
See application file for complete search history.

(56) References Cited

U.S. PATENT DOCUMENTS 720,407 A * 2/1903 Collins ................. F16L 41/021 285/133.4
3,851,899 A * 12/1974 Franz ...................... H01L 21/00 285/95

(Continued)

FOREIGN PATENT DOCUMENTS

CN 205806940 U 12/2016
CN 111033109 A 4/2020

(Continued)

OTHER PUBLICATIONS

Espacenet Bibliographic data: CN 205806940 (U), Published Dec. 14, 2016, 1 pg.

(Continued)

*Primary Examiner* — Kevin F Murphy
(74) *Attorney, Agent, or Firm* — Rankin, Hill & Clark LLP

(57) ABSTRACT

A distribution line component for a motor vehicle, including a line housing having a first line opening and having a second line opening, the first and the second line openings being connected to each other in fluid-conducting fashion by a line configuration in the line housing, the distribution line component including, for protection against the effects of a thermally caused increase in volume of a fluid accommodated in the line housing, a volume equalization component compressible by fluid in the line housing, a connection formation for connecting to a counterpart connection formation of a further line component being developed in the area of at least one line opening; the volume equalization component being situated in or on the connection formation and assigned to its line opening in such a way that a section of the further line component connected to the connection formation contributes jointly with the line housing to secure (Continued)

the position of the volume equalization component on the line housing.

5 Claims, 4 Drawing Sheets

(56) References Cited

U.S. PATENT DOCUMENTS 4,461,498 A * 7/1984 Kunsman .............. F16L 43/001 285/55
4,475,748 A * 10/1984 Ekman ................ F16L 19/0206 285/388
5,118,141 A * 6/1992 Miyashita ............ F16J 15/0893 285/23
5,711,550 A * 1/1998 Brandt ................ F16L 37/0925 285/307
7,278,625 B2 10/2007 Huber et al.
8,555,624 B2 * 10/2013 Lechner .................. F16L 21/08 285/305
8,567,827 B2 * 10/2013 McGuire ............. F16L 19/0231 285/91
8,757,668 B2 * 6/2014 Haeckel .................. F16L 51/00 138/28
8,820,795 B2 * 9/2014 Dole ....................... F16L 43/00 285/179
9,371,758 B2 * 6/2016 Truong ................... F01N 3/208
9,371,947 B2 * 6/2016 Choi ................... F16L 37/0927
9,909,718 B2 3/2018 Wittbold et al.
10,480,692 B2 * 11/2019 Smith ................... F16L 19/075
10,704,722 B2 * 7/2020 Williams ................ F16L 37/23
10,711,934 B2 * 7/2020 Sireude ................. F16L 37/098
10,947,880 B2 * 3/2021 Hatfield ................ F01N 3/2066
10,975,821 B2 * 4/2021 Jovovic .............. F02M 21/0263
11,561,146 B2 * 1/2023 Wohlgemuth .......... G01L 19/06
11,668,042 B2 6/2023 Leonard et al.
11,781,688 B2 * 10/2023 Williams .............. F16L 37/088 285/321
2006/0185744 A1 8/2006 Hecking
2009/0079186 A1 3/2009 Frost et al.
2013/0255813 A1 10/2013 Auclair et al.
2020/0018433 A1 1/2020 Zwillus et al.
2021/0002874 A1 1/2021 Petschl

FOREIGN PATENT DOCUMENTS

CN 212252091 U 12/2020
DE 102007026892 A1 12/2008

OTHER PUBLICATIONS

Espacenet Bibliographic data: CN 111033109 (A), Published Apr. 17, 2020, 1 pg.
Espacenet Bibliographic data: CN 212252091 (U), Published Dec. 29, 2020, 1 pg.
German Search Report for corresponding DE 10 2021 101 639.8 mailed Sep. 22, 2021, 6 pgs.
Espacenet Bibliographic data: DE 102007026892 (A1), Published Dec. 18, 2008, 1 pg.

* cited by examiner

DISTRIBUTION LINE COMPONENT AND DISTRIBUTOR ASSEMBLY MODULARLY FORMED THEREWITH

This application claims priority in German Patent Application DE 10 2021 101 639.8 filed on Jan. 26, 2021, which is incorporated by reference herein.

The present invention relates to a distribution line component for a motor vehicle, comprising a line housing having a first line opening and having a second line opening, the first and the second line openings being connected to each other in fluid-conducting fashion by a line configuration in the line housing, the distribution line component having a volume equalization component compressible by the fluid in the line housing for protecting against effects of a thermally caused volume increase of a fluid accommodated in the line housing, a connection formation for connecting to a counterpart connection formation of a further line component being developed in the area of at least one line opening.

BACKGROUND OF THE INVENTION

A distribution line component of this kind is known from DE 10 2018 104 739 A1. This known distribution line component has inter alia a compressible flow-through volume equalization component formed from a closed-cell foam material, which is situated in a chamber that is formed between two line openings connected by a line, at a distance from these, on the line connecting the line openings. In the event of a thermally caused volume increase, the fluid is able to expand by radially compressing the volume equalization component, without thereby damaging the line component.

As a general principle, such a volume equalization component in a line housing is used to provide additional volume, which may be occupied by a thermally expanding fluid in the line housing by displacing the volume compensation component. The most significant case in this regard is the thermal expansion of a fluid in a change of its state, for example from liquid to solid or vice versa.

Especially in fluids that include a significant portion of water, the transition from liquid to solid may involve a considerable increase in volume, while the fluid mass remains essentially the same. Providing a compressible volume equalization component that is thus displaceable by the expanding fluid thus prevents a direct load on the line housing, which would arise if the fluid would only be able to expand against the line housing and would consequently induce stresses in the latter.

According to another specific embodiment known from DE 10 2018 104 739 A1, the volume equalization component is accommodated as a diaphragm component in an extension, which projects radially from the line connecting the line openings to each other. A gas volume is accommodated in the extension and is separated from the line by the diaphragm component. In the event that the fluid in the line expands due to thermal causes and increases in volume while the mass remains essentially the same, the diaphragm of the diaphragm component is deformed against the gas volume in the extension and thus allows for the increase in volume required for the expanding fluid.

A fluid line component is known from U.S. Pat. No. 8,757,668 B2, according to which line openings situated at different longitudinal ends of a line housing are connected in fluid-conducting fashion by a line passing through the line housing. A chamber belonging to the line is formed in the line housing, in which a compressible volume equalization component is accommodated, around which fluid flowing between the two line openings flows in conventional fluid conducting operation.

SUMMARY OF THE INVENTION

Starting from the distribution line component known from DE 10 2018 104 739 A1, it is the objective of the present invention to develop the distribution line component mentioned at the outset further in such a way that the volume equalization component accommodated therein may be installed therein in a particularly simple manner and may likewise be retained therein at the location where it was situated in a particularly simple manner.

The present invention achieves this objective on a distribution line component mentioned at the outset in that the volume equalization component is situated in or on the connection formation and is associated with its line opening in such a way that a section of the further line component connected with the connection formation together with the line housing contributes to securing the position of the volume equalization component on the line housing. It is thus possible to situate the volume equalization component very simply in the line housing, the securing of its position, however, only being completed by situating the further line component on the line housing. As long as the further line component is not situated on the line housing, the space occupied by the further line component through the connection of the further line component with the line housing is available for an advantageously simple installation of the volume equalization component on the line housing. By way of example, the volume equalization component may simply be inserted from a free longitudinal end of the connection formation into the latter.

The same applies for securing the position of the volume equalization component on the line housing. It is thus possible to omit a difficult development of a receiving chamber, as it is known from the related art, in particular in the area of the line configuration between and at a distance from the line openings. The volume equalization component may be situated in a simple, but very effective manner, between a section of the line housing, in particular an end face of the line opening and the further line component, and secured against loss.

In other words, the aforementioned objective is achieved in that a receiving area of the line housing, in which the volume equalization component is accommodated, is formed in at least one direction by a surface of the further line component. This may be for example an end face of the further line component, in particular of a line opening of the further line component.

In general, according to the present application, it shall hold true that, at a line opening, fluid exits or enters the associated line, depending on the direction of flow, the end face of the line opening surrounding the exit opening and pointing in the direction of the exit of fluid from the associated line. The end face of the line opening of the line configuration in the line housing may be formed for example by a radial step in the transition from the line configuration to the connection formation. This applies especially if the connection formation, as is preferred, is developed as a female bushing, into which a counterpart connection formation in the form of a male connector may be inserted.

As a consequence of the described arrangement, according to the invention, of the volume equalization component in the line housing, when the line housing is not connected to the further line component, the volume equalization component may be accommodated in the line housing in such a way that it surrounds a fluid line extending along a line path at least in sections around the circumferential direction around the line path. The line path in this case locally defines respectively two axial directions pointing in opposite directions. An axial movement of the volume equalization component along the one axial direction defined by the line path may be limited by a contact surface of the line housing. This limitation may be provided for example by the aforementioned end face of the line opening, particularly preferably in the form of the described radial shoulder. Furthermore, the volume equalization component may be exposed at least in sections in the other axial direction opposite the one axial direction. This makes it possible simply to insert the volume equalization component toward the line opening into the line housing from the axial end, opposite the line opening, of the connection formation associated with the line opening. The present paragraph thus also describes in alternative words a way in which the aforementioned objective is achieved.

In principle, it is conceivable to provide at an axial distance from the line opening an at least sectionally, preferably completely, circumferential radial projection on the connection formation, which forms a first captive connection of the volume equalization component on the line housing. This radial projection may act in the manner of a detent that the fundamentally elastic volume equalization component is able to overcome. The radial projection thus extends preferably over less than half of the radial extension of the volume equalization component, preferably over less than 30%, particularly preferably over less than 10% of the radial extension of the volume equalization component. Following the installation of the further line component on the line housing, the radial projection may then be supplemented by a surface of the further line component, in particular by its end face.

In order to render the production of the line component and the handling of the volume equalization component on the line component as simple as possible, the volume equalization component is retained on the line housing in the direction away from the line opening only in frictionally engaged fashion and/or integrally by an adhesive agent until the volume equalization component is retained in form-locking fashion on the line housing by connecting the line housing to the further line component. In this case, the volume equalization component is preferably fully exposed in the aforementioned other axial direction.

Although it may suffice for the volume equalization component to extend only along a circumferential section around the line path, while at least one further circumferential section around the line path is free of the volume equalization component, for the purpose of providing a possibility for volume expansion that is as symmetrical as possible, it is preferred if the volume equalization component surrounds the line path completely as a flow-through volume equalization component. The volume equalization component is therefore preferably developed to be annular or sleeve-shaped.

For reasons of achieving a structural design of the distribution line component that is as simple as possible, the volume equalization component is preferably wettable by the fluid flowing through the line housing.

Quite independently of its concretely chosen shape, the volume equalization component has a lower pressure stiffness and/or tensile stiffness than the line housing. This ensures that in the event of a volume expansion of the fluid in the line housing, the volume equalization component may be compressed by the expanding fluid, while the line housing is able essentially to maintain its desired original shape. In this manner, the line housing may be relieved of an excessive action of force by the expanding fluid. The lower pressure stiffness and/or tensile stiffness may be achieved in terms of shape and/or material. In order to be able to provide the greatest possible equalization volume achievable by compression of the volume equalization component, which may be occupied by the expanding fluid, the volume equalization component is preferably formed of a material that has a lower modulus of elasticity than the material of the line housing. The volume equalization component may have a gas volume enclosed by a polymer shell. The gas volume may be subdivided into multiple partial volumes as is the case in a closed-cell foam material, for example. But an annular or sleeve-shaped hollow volume equalization component having a single enclosed gas volume is also conceivable as a development.

Preferably, the volume equalization component is limited in its mobility not only axially with regard to the line path or preferably fixed in place axially, but also radially, that is, in a direction orthogonal to the line path. The volume equalization component therefore preferably abuts on an inner circumferential surface of the line housing radially on the outside with respect to the line path. The inner circumferential surface of the line housing may be formed by the connection formation, which is preferably designed as a plug-in bushing.

To facilitate the establishment of a connection between the line housing and the further line component, the connection formation as connection bushing may have a greater clear width than the line opening. In this case, the aforementioned radial shoulder may be formed between the line opening and the connection formation.

For controlling fluid flows through the line housing, the further line component may have a valve configuration, which is switchable between a passage state, in which a line developed in the further line component, subsequent to the line opening associated with the volume equalization component is unblocked to allow fluid to flow through, and a blocking state, in which the line developed in the further line component is blocked for a passage of fluid. In this case, a fluid flow may be permitted or blocked, preferably also quantitatively controlled, at least through the line opening to which the valve configuration connects. The valve configuration is preferably electrically switchable between its operating states, although an automatic valve configuration, for example a spring pre-loaded check valve, shall not be excluded.

Additionally or alternatively, the further line component may generally have a pipe connector or be merely a pipe connector. The further line component may be for example a further distribution line component, which is developed like the distribution line component discussed above. From such distribution line components, preferably of the same kind, it is possible to build in modular fashion a distributor assembly for distributing fluid flows in particular in motor vehicles in a simple and safe fashion. For this purpose, the connection formation may be developed in the area of a line opening of the first and the second line openings, and, in the area of the respective other line opening, a counterpart connection formation suitable for connecting to the connection formation may be developed, so that two distribution line components, in particular two distribution line components of the same kind, are connectible to each other in a fluid-conducting manner by connecting the connection formation and the counterpart connection formation.

According to a preferred specific embodiment of the present invention that is simple to handle, a connection formation on a line opening of the first and the second line openings may be formed as a male plug-in connector, and the respective other connection formation on the respective other line opening may be formed as a female plug-in bushing, the plug-in connector fitting into the plug-in bushing. In this case, the first and the second line openings are preferably connected to each other by a line, whose line path lies in one plane, particularly preferably running in straight linear fashion, so that multiple distribution line components, in particular multiple distribution line components of the same kind, are able to form a distributor assembly that extends essentially in one plane and thus takes up as little space as possible.

When the further line component comprises the valve configuration, the latter is preferably permanently situated on the line housing and is connected to the latter in fluid-conducting fashion. In general, the further line component may initially not be situated on the distribution line component and may be disposed on the latter only at a later time, for example, when the aforementioned modular distributor assembly is formed from multiple distribution line components, in particular from multiple distribution line components of the same kind.

Likewise, the further line component may be a dummy plug, if in the area of a line opening no continuing fluid line is needed, for example in a, in the direction of flow, final distribution line component of a distributor assembly, or if the distribution line component has more line openings than required in the concrete application case. For, in principle, the distribution line component may comprise more than only the aforementioned two line openings.

For securing the fluid-conducting connection between the line housing and the further line component, according to a preferred development, a locking formation is developed in the area of at least one line opening of the first and the second line openings, with which a counterpart locking formation situated in the further line component is able to lock in a form-locking, preferably releasable, fashion. In order to secure two distribution line components, in particular two distribution line components of the same kind, which are connected to each other via the connection formation of the one distribution line component and the counterpart connection formation of the respective other distribution line component, against unintentional release, a counterpart locking formation suitable for locking together with the locking formation may be additionally developed in the area of the respective other line opening. Due to the preferred modular construction, it is thus possible also to connect more than two distribution line components in particular more than two distribution line components of the same kind, in series to form a modularly configurable distributor assembly.

For example, a formation made up of a locking formation and a counterpart locking formation may comprise a projection, and the projection may be able to engage the respective other formation from behind. For establishing a secure lock quickly and in an uncomplicated manner, the locking formation and the counterpart locking formation of the distribution line component on the one hand and of the further line component on the other hand may form a bayonet lock by way of preferably separate distribution line components, in particular by way of preferably separate distribution line components of the same kind.

In addition to merely securing against release, the locking formation and the counterpart locking formation may also be used to establish a defined relative position of the line and/or line housing sections that are connected to one another. For example, the locking formation and the counterpart locking formation may perform in sections a screw motion when establishing the form-locking locking engagement between them, during which the line housing sections that are connected to one another and are to be locked perform an axial approach movement due to a relative rotation about a common relative axis of rotation. This makes it possible to improve the tightness of the connection of the line housing and the further line component, in particular of two line housing sections of different line housings, against fluid seepage. Hence, according to an advantageous development, it may be provided quite generally that the locking formation of the line housing and the counterpart locking formation of the further line component have contact surfaces developed for abutting against each other, which in the locked state of line sections connected to each other in fluid-conducting fashion, particularly preferably of separate distribution components, in particular of the same kind, define a relative position of the two distribution line components by abutting against each other.

In principle, the line housing may have more than only the aforementioned first and second line openings, for example if the line housing is to form a line branching. Consequently, the line housing may have a third line opening, which is connected by the line configuration to the first and to the second line openings. Preferably, a connection formation is then developed in the area of the third line opening, to which a suitable counterpart connection formation of the further line component comprising the valve configuration is connected. Thus, a first line branch, which connects the first and the second line openings to each other in fluid-conducting fashion, may pass through the line housing, so that when a modular distributor assembly is formed from two or more distribution line components, in particular from two or more distribution line components of the same kind, the first line branches form a main line passing through the entire distributor assembly and thus supplying it with fluid. A second line branch may lead from the third line opening to the first line branch, so that below the preferred position of the valve configuration on the third line opening, the second line branch forms a kind of tap line, by which fluid may be discharged from the first line branch.

If a fourth or even further line openings are developed on the line housing, the further line branch leading to the fourth or to the further line opening may open into the first line branch or into the second line branch or generally into a tap line coming off already from the first line branch.

A distributor assembly was already described above that is formed from at least two distribution line components that were likewise described above. Due to its modular configurability, this distributor assembly is so advantageous that the present invention also relates to a distributor assembly for distributing a fluid, comprising at least two distribution line components described above, at least one of the distribution line components being a distribution line component, which has in the area of a line opening of the first and the second line openings the connection formation and in the area of the respective other line opening a counterpart connection formation suitable for connecting to the connection formation, so that two distribution line components, in particular so that two distribution line components of the same kind, are connectible to each other in fluid-conducting fashion by connecting the connection formation and the counterpart connection formation, and at least one of the distribution line components being a distribution line component, in which the line housing has a third line opening, which is connected by the line configuration to the first and to the second line openings. The distribution line component with the connection formation and the counterpart connection formation may be the same distribution line component that has the third line opening, or these distribution line components may be different distribution line components.

In the case in which the distribution line component has a third line opening, the volume equalization component may be situated on the first line branch and/or on the second line branch. Although situating volume equalization components in the area of both line branches provides greater safety for the line housing against bursting due to a thermally expanding fluid in the line housing, it is often sufficient to situate only one volume equalization component in the line housing. The volume equalization component is then preferably located in the area of the first line branch passing through the line housing, to which the first line branch of a further distribution line component may be connected. As already described above, the volume equalization component is preferably located in the area of a connection formation in the form of a female plug-in bushing.

A distribution line component formed in this manner may be used in a motor vehicle to conduct an operating liquid as fluid to different consumers. For example, the operating liquid may be a washing liquid, which is conducted to the windshield and/or to the rear window and/or to the headlights of the motor vehicle as a function of control commands that are triggered by sensors and/or entered by operator input. Alternatively, the operating liquid may be a cooling liquid, which is conducted to different consumers to be cooled as a function of individual cooling requirements.

It shall be it noted expressly that the ordinal numbers assigned to technical features in the present application, such as for example "second" or "third" line opening, are solely based on the respective first mention of the associated technical features and merely serve to differentiate technical features denoted in similar fashion.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

Figure 1:
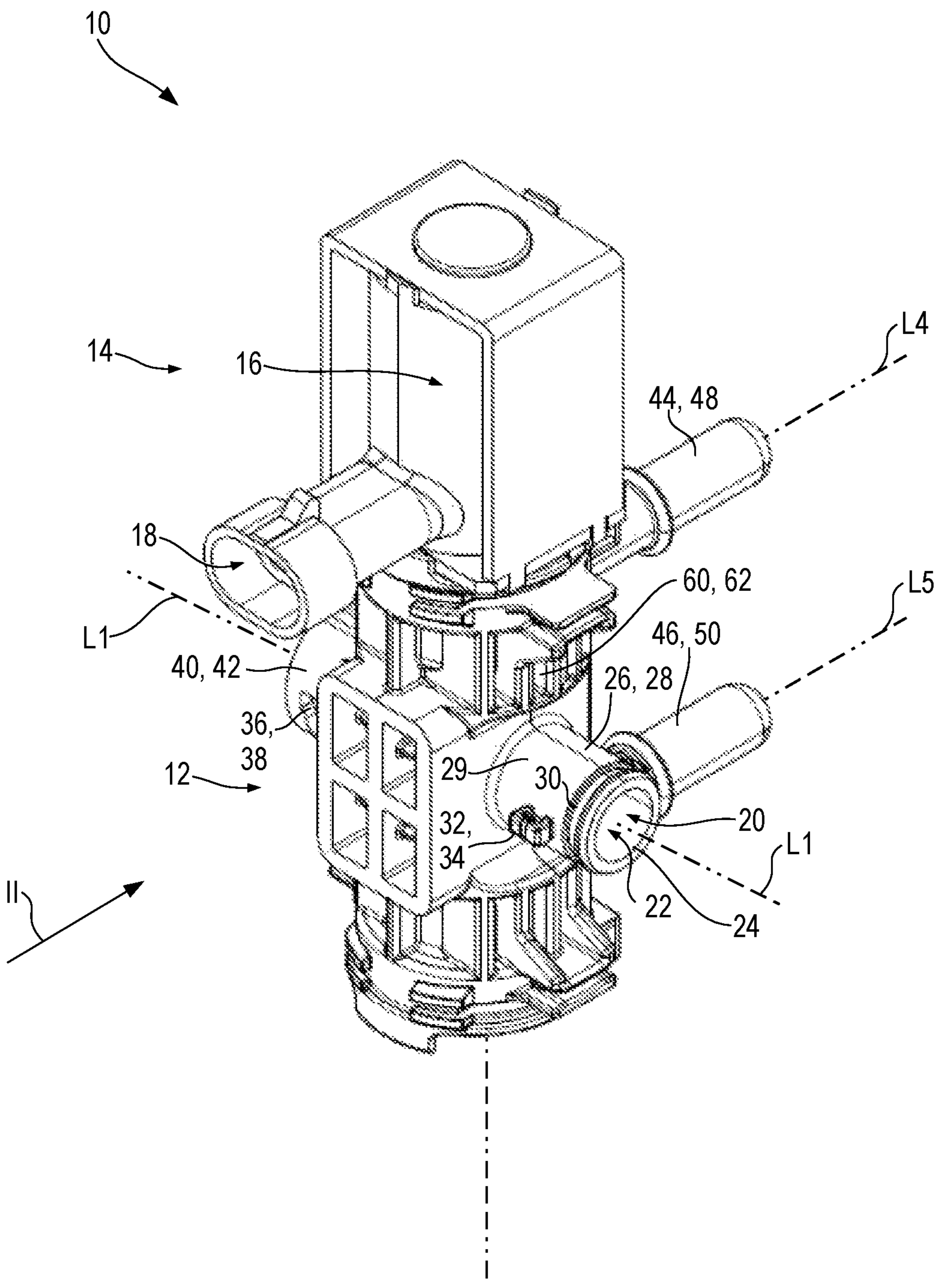
FIG. 1 a first specific embodiment of a distribution line component according to the present invention in a schematic perspective view, FIG. 2 a schematic top view onto the distribution line component of FIG. 1 along the direction of view II in FIG. 1, FIG. 3 a rough schematic cross-sectional view through the distribution line component of FIG. 2 along the sectional plane III-III in FIG. 2, FIG. 4 a rough schematic cross-sectional view through a distributor assembly, formed from two distribution line components of the same kind of a second specific embodiment according to the invention.

The crosshatching in the drawings is not intended to identify a material.

DESCRIPTION OF PREFERRED EMBODIMENTS

Figure 2:
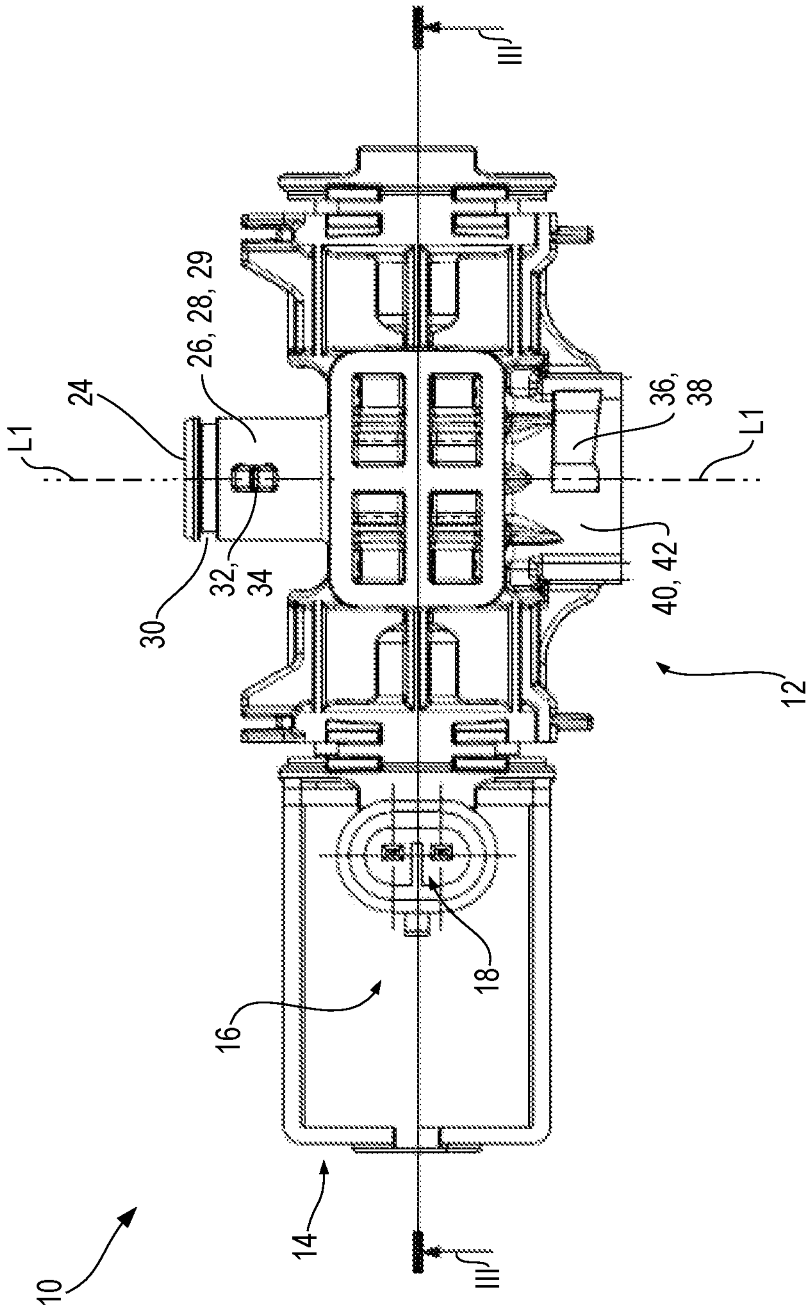
Figure 3:
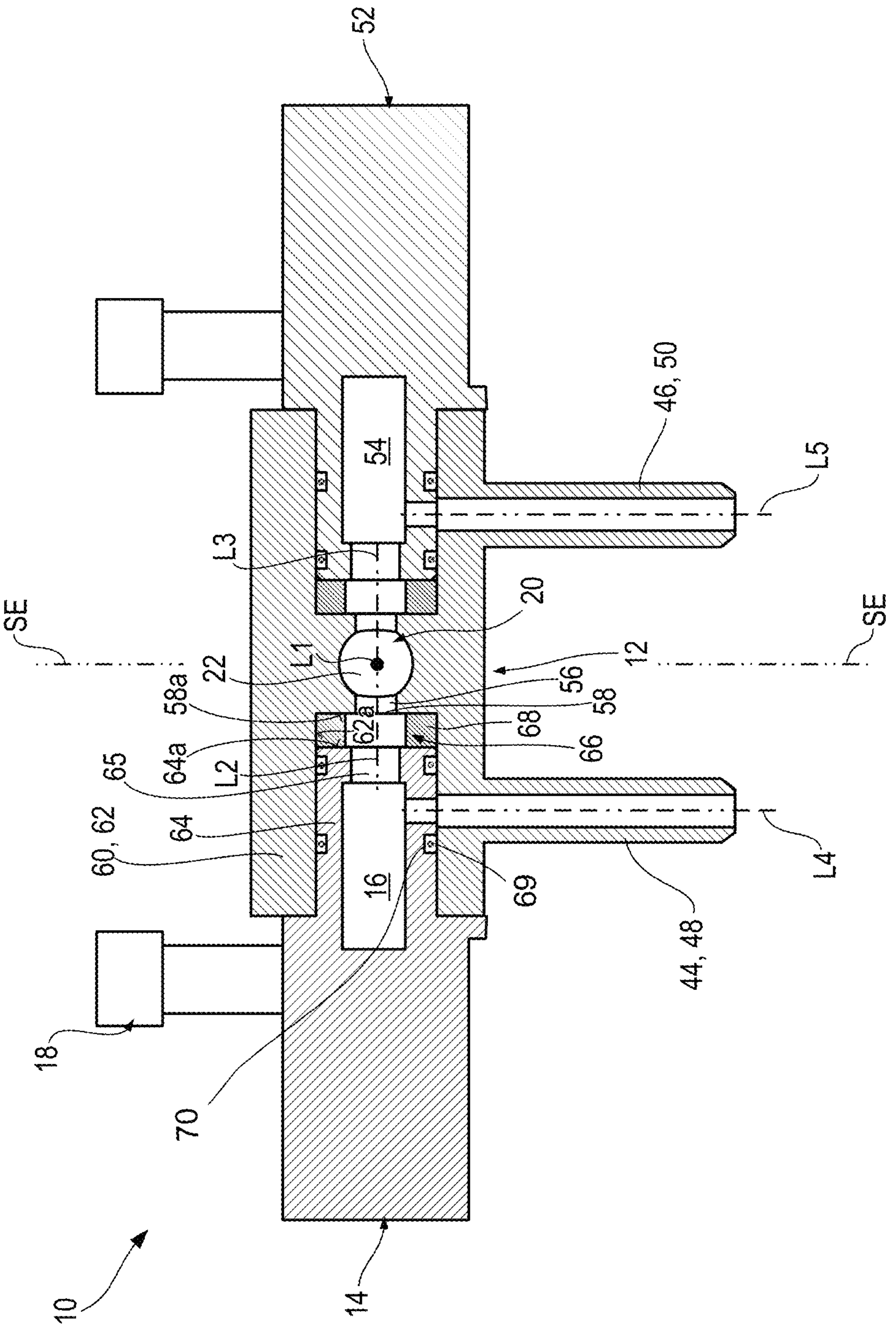

Referring now to the drawings wherein the showings are for the purpose of illustrating preferred and alternative embodiments of the invention only and not for the purpose of limiting the same, in FIGS. 1 through 3, a first specific embodiment of a distribution line component according to the invention is generally designated by 10. Distribution line component 10 comprises a preferably injection molded line housing 12. A further line component 14 having a valve configuration 16 accommodated within it is connected to line housing 12 by way of example. An electrical connection line for supplying the valve configuration 16 with electrical energy and with control commands may be connected to valve configuration 16 via a connection socket 18.

A line configuration 20 extends in line housing 12, from which a first line branch 22 passes through line housing 12 in a straight line along a first line path L1. A longitudinal end of the first line branch 22 ends in a first line opening 24. The first end section 26 comprising the first line opening 24 is developed as a counterpart connection formation 28 in the shape of a tubular male plug-in connector 29. It advantageously has a circumferential sealing configuration (not shown), for example an O-ring inserted into a groove 30.

The first line branch 22 ends at its opposite longitudinal end in a second line opening, which is concealed in FIGS. 1 and 2 by connection formation 40 at the same longitudinal end of first line branch 22.

A counterpart locking formation 32 in the shape of a projection 34 protrudes radially, with respect to first line path L1, from counterpart connection formation 28, which counterpart locking formation 32 fits into locking formation 36 developed as locking recess 38 in the area of connection formation 40 in the other longitudinal end area of first line branch 22 for producing a form-locking bayonet lock as a securing device against withdrawal. Of course, a further distribution line component essentially of the same kind comprising a connection formation 40 and a locking recess 38 is to be used for this purpose. Connection formation 40 is developed as a female plug-in bushing 42.

Further line formations 44 and 46 extend away from line housing 12 at a distance from first line path L1 along parallel further line paths L4 and L5, respectively. The further line formations 44 and 46 are in turn developed as further connection formations 48 and 50, respectively, onto which for example an elastic hose may be plugged or which may be plugged into corresponding plug-in bushings of further pipelines.

At the lower end in FIG. 1 or at the right end in FIG. 2 of line housing 12, a still further line component including a valve configuration may be situated, this still further line component being developed to be identical with the further line component 14 at least with regard to its outer shape; for the purpose of using identical parts, it being developed to be particularly preferably altogether identical.

In the merely rough schematic cross-sectional view of FIG. 3, the mentioned still further line component is represented for illustration as the still further line component 52 including a further valve configuration 54 connected to line housing 12.

Line housing 12 is constructed in mirror symmetry with regard to a mirror symmetry plane SE that contains line path L1 and is parallel to line paths L4 and L5. The further line components 14 and 52 are also constructed in mirror symmetry with regard to the mirror symmetry plane SE.

Line configuration 20 comprises a second line branch 56, which, starting from first line branch 22 along a second line path L2, branches off as a tap line from first line branch 22. Second line branch 56 opens in a third line opening 58, to which a second connection formation 60 connects in the form of female plug-in bushing 62. A second counterpart connection formation 60 of the further line component 14 in the shape of a pipe connector 64 is plugged into this second connection formation 60 for connecting to line housing 12. Pipe connector 64 is thus also a male plug-in connector. A line 65 in the further line component 14 connects to the second line branch 56 of line housing 12.

The further line component 14 connects the second line branch 56 via line 65 to line formation 44, with valve configuration 16 situated in between. The equivalent applies as shown by FIG. 3 for the still further line component 52 and line formation 46.

End face 58*a* of third line opening 58 and end face 64*a* of pipe connector 64 axially bound a receiving area 66 with respect to second line path L2, in which a volume equalization component 68 encircling the second line path L2 in closed annular fashion is accommodated. Receiving area 66 is bounded radially outward by the inner circumferential wall 62*a* of female plug-in bushing 62 of the second connection formation 60. Volume equalization component 68, which is formed from an elastic plastic having a gas volume enclosed therein, is thus fixed in its position relative to line housing 12 only by two different components, in the present case by line housing 12 and by the further line component 14. As long as the further line component 14 and in particular its pipe connector 64 or a dummy plug are not inserted into the second connection formation 60, an axial end face, pointing away from the associated line opening, of the volume equalization component 68 situated in the second connection formation 60 is exposed. The connection between pipe connector 64 and inner circumferential wall 62*a* of female plug-in bushing 62 can include one or more sealing configurations that can include an O-ring 69 inserted into a groove 70 wherein the sealing configuration is not exposed to the fluid.

It is thus very easy to situate the volume equalization component 68 in the area of the third line opening 58, since it may be simply inserted along the second line path L2 into the second connection formation 60, which has a greater inner diameter than the second line branch 56.

If fluid present in line configuration 20, in particular an aqueous liquid, freezes and thereby expands, the expanding fluid is able to compress the volume equalization component 68 and thereby gain space for its expansion. In the process, the radially inner section of the volume equalization component 68, which is wetted by the fluid, is displaced radially outward, the radially outer section of the volume equalization component 68 being radially outwardly fixated with respect to a radial displacement by the inner circumferential wall 62*a* of plug-in bushing 62.

In the exemplary embodiment of FIGS. 1 through 3, the line formations 44 and 46 are formed in one piece with line housing 12. Alternatively, line formations 44 and 46 may be formed in one piece with the further line component 14.

Figure 4:
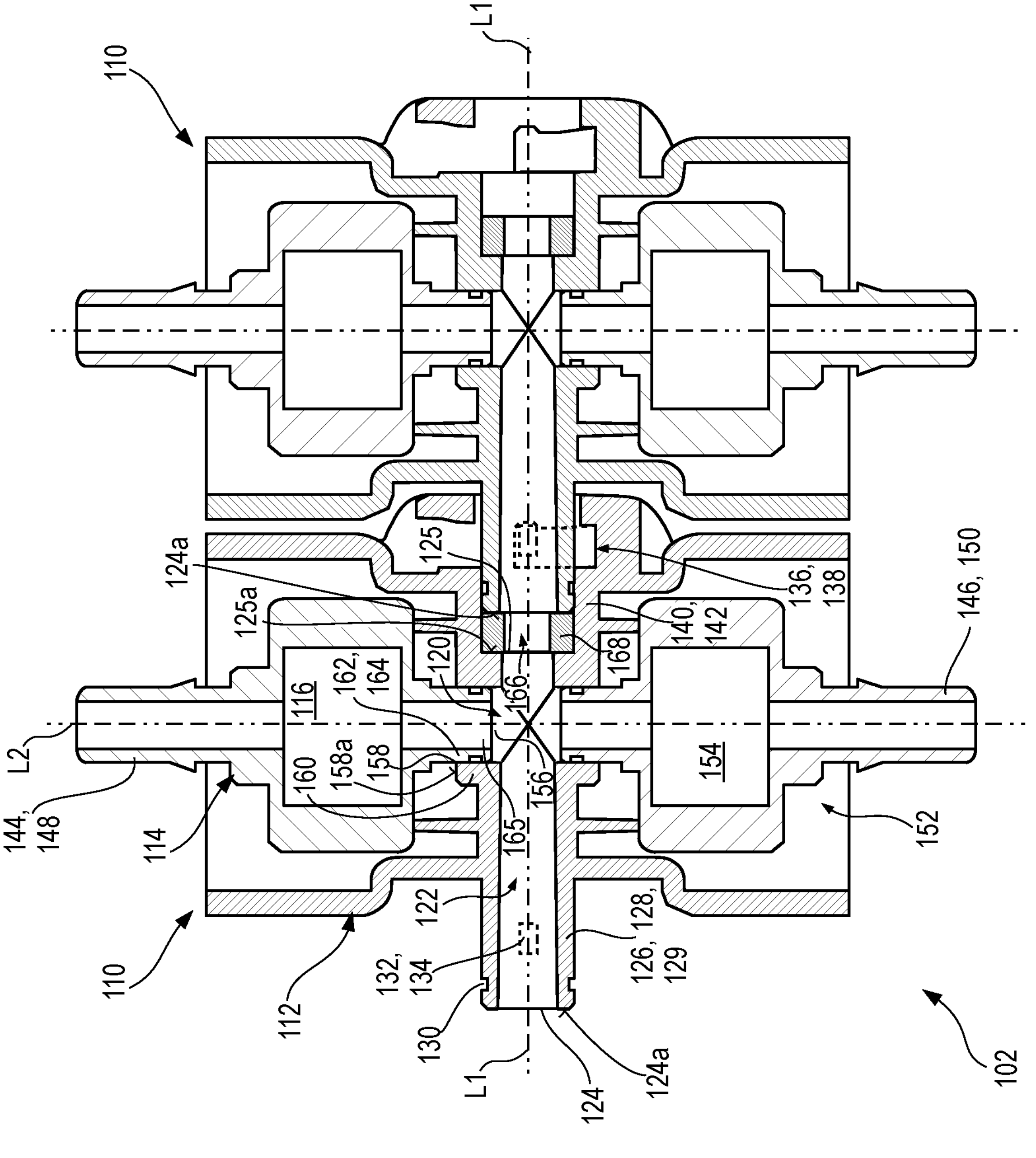

FIG. 4 shows a second specific embodiment of a distribution line component according to the invention. Components and component sections identical and functionally identical to those in the first embodiment are labeled in the second specific embodiment with the same reference numerals, but incremented by the number 100. The second specific embodiment will be explained below only to the extent that it differs from the previously described first specific embodiment, express reference being made to its description also for explaining the second specific embodiment. Given the identical development of the two distribution line components 110 of FIG. 4, for the sake of better clarity essentially only the left distribution line component 110 is provided with reference numerals in FIG. 4.

FIG. 4 shows two distribution line components 110, which are essentially identically developed and which are connected to form a distributor assembly 102 and are secured against release in the connected state.

On the one hand, in FIG. 4, the further line formations 144 and 146 are not formed in one piece with the line housing 112, but rather in one piece with the further line components 114 and 152.

On the other hand, in FIG. 4, the volume equalization component 168 is indeed again situated in the area of a line opening, but not of the third line opening 158, but rather in the area of the second line opening 125. The receiving area 166 of the volume equalization component 168 is limited axially with respect to line path L1 by an end face 125*a* of the second line opening 125 as well as by an end face 124*a* of the first line opening of the distribution line component 110 on the right in FIG. 4. Receiving area 166 is bounded radially outwardly by an inner circumferential wall of the connection formation 140 developed as plug-in bushing 142.

As in the first specific embodiment, in the second specific embodiment the volume equalization component 168 is axially captively situated on line housing 112 only once the connection formation 140 is connected to a counterpart connection formation 128 of distribution line component 110 on the right in FIG. 4. Prior to inserting the counterpart connection formation 128 of the right distribution line component 110 into the connection formation 140 of the left distribution line component 110, an axial end face of volume equalization component 168 is exposed. The greater inner diameter of connection formation 140 in comparison to the first line branch 122 facilitates the installation and, if necessary, also the replacement of volume equalization component 168 on line housing 112.

Line housings 12 and 112 are shown in FIGS. 1 through 4 advantageously as one-piece injection molded parts. As a variant, the line housings may also be formed from multiple housing parts.

Approximately at the center of the image of FIG. 4, one is able to discern how a counterpart locking formation in the form of a projection, situated on a side of counterpart connection formation 128 facing away from the viewer of FIG. 4, of the distribution line component 110 on the right in FIG. 4, engages into the locking formation 136 developed as locking recess 138 of the distribution line component 110 on the left in FIG. 4. To produce this locking engagement, the connection formation 140 of the left distribution line component 110 and the counterpart locking formation of the right distribution line component 110 of FIG. 4 are situated coaxially, yet rotated relative to each other, are then axially brought closer to each other, are connected by being fitted into each other and are rotated by relative rotation about the first line path L1 as the axis of rotation into the position shown in FIG. 4. A bayonet lock is thereby established. Mutually abutting surfaces of locking formation 136 and counterpart locking formation 132 ensure a defined relative position of the two distribution line components 110 in the distributor assembly 102 formed by the latter.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A distribution line component for a motor vehicle, the distribution line component comprising a line housing having a first line opening and having a second line opening for a flow of associated fluid, the first line opening and the second line opening being connected to each other in fluid-conducting fashion by a line configuration in the line housing for the flow of associated fluid, the line configuration having a first line branch in fluid connection with the first line opening and a second line branch being a tap line from the first line branch and fluidly between the first and second line openings, the second line branch being in fluid connection with a third line opening in the line housing, the third line opening extending into a female plug in bushing connector formed by a bushing end face and an inner circumferential wall; the distribution line component further comprising a further line component, the further line component having a male plug in pipe connector having an outer circumferential wall and a plug end face, the further line component further including an internal fluid line for the flow of associated fluid and in fluid connection with the third line opening in the line housing, the plug end face being spaced from the bushing end face forming a receiving area therebetween, the receiving area having a diameter greater than the third line opening; the distribution line component further comprising a volume equalization component that is compressible by a thermally caused increase in volume in the fluid in the line housing, the volume equalization component being annular having a first side edge and a second side edge that is parallel to the first side edge, the first side edge engaging the plug end face and the second side edge engaging the bushing end face in the receiving area, the volume equalization component having a radial outer edge engaging the inner circumferential wall of the female plug in bushing connector, the volume equalization component further including an inner circumferential wall facing a fluid path in fluid connection with the third line opening, the plug end face and the bushing end face maintaining the position of the volume equalization component within the receiving area, the inner circumferential wall of the volume equalization component having an inner surface engaged by the flow of associated fluid wherein the thermally caused increase in volume in the fluid compresses the volume equalization component; and wherein the volume equalization component extends only along a partial angular section of a circumference of the fluid path, such that the volume equalization component covers less than a full 360° circumference around the flow path, and at least one complementary angular section of the circumference of the fluid path remains uncovered by the volume equalization component.

2. The distribution line component as recited in claim 1, wherein the volume equalization component has a central flow path and the flow of the associated fluid in the line housing passing through the central flow path, an axial movement of the volume equalization component along one axial direction defined by the line path being limited by the bushing end face of the line housing.

3. The distribution line component as recited in claim 1, wherein the inner surface of the volume equalization component is an inner circumferential surface and defines the central flow path, all of the inner circumferential surface is in contact with the flow of associated fluid.

4. The distribution line component as recited in claim 1, wherein the line housing further includes a fourth line opening, which is connected by the line configuration to the first and to the second line openings, the female plug in bushing connector being a first female plug in bushing connector, the bushing end face being a first bushing end face, the an inner circumferential wall being a first inner circumferential wall; the fourth line opening extending into a second female plug in the bushing connector formed by a second bushing end face and a second inner circumferential wall, the further line component being a first further line component and the distribution line component including a second further line component, the male plug in pipe connector being a first male plug in pipe connector and the outer circumferential wall being a first outer circumferential wall and the plug end face being a first plug end face, the second further line component having a second male plug in pipe connector having a second outer circumferential wall and a second plug end face, the volume equalization component being a first volume equalization component and the distribution line component having a second volume equalization component adjacent the second plug end face of the second further line component.

5. A distributor assembly for distributing a fluid, comprising at least two distribution line components as recited in claim 1, at least one of the at least two distribution line components being a distribution line component wherein a connection formation is developed in the area of a line opening of the first and the second line openings and, in the area of the respective other line opening, a counterpart connection formation suitable for connecting to the connection formation is developed, so that two distribution line components of the same kind are connectible to each other in a fluid-conducting manner.

* * * * *